Stoll & Gross.
Manure Fork.
No. 84,691.   Patented Dec. 8, 1868.
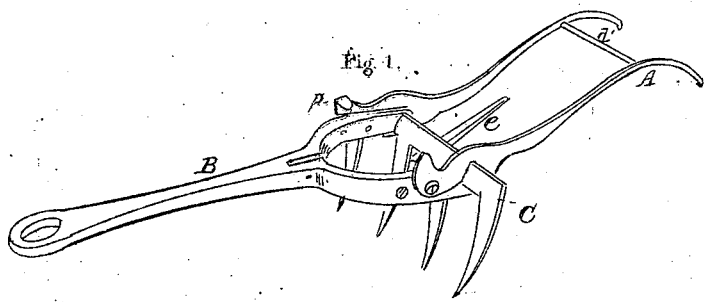
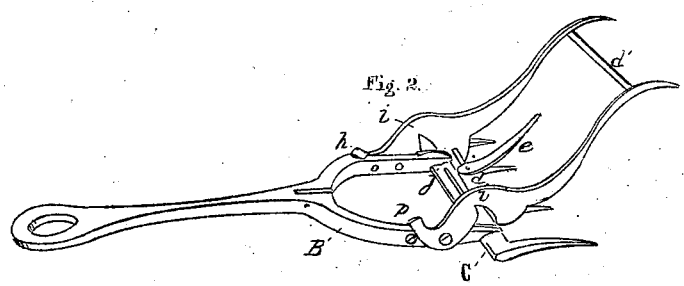
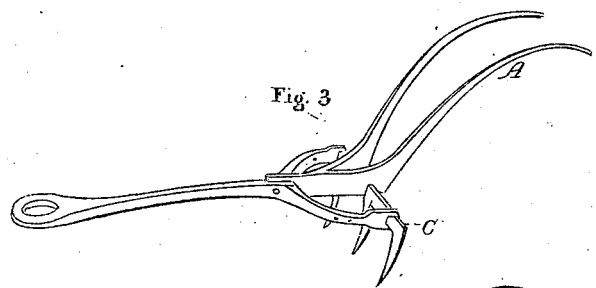
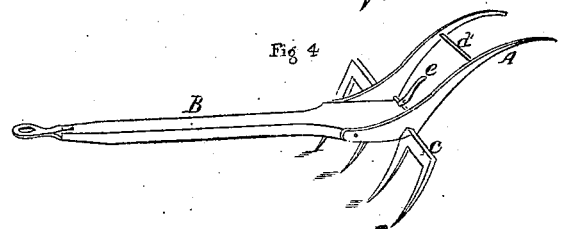
John A. Gross
F. C. Robbins
Henry Gross
Michael Stoll
Inventors
By Cathy Wilson

United States Patent Office.

MICHAEL STOLL AND HENRY GROSS, OF MIDDLETOWN, PENNSYLVANIA, ASSIGNORS TO HENRY GROSS.

Letters Patent No. 84,691, dated December 8, 1868.

IMPROVEMENT IN MANURE-HOOKS.

The Schedule referred to in these Letters Patent and making part of the same.

*To whom it may concern:*

Be it known that we, MICHAEL STOLL and HENRY GROSS, of Middletown, Dauphin county, in the State of Pennsylvania, have made new and useful Improvements in "Manure-Hooks;" and we hereby declare the following to be a full and exact description of the same, reference being had to the drawings that accompany and form a part of these specifications, in which—

Figure 1 is a perspective view.

Figure 2, view showing the manner of discharging the load.

Figure 3, view showing a different manner of attaching the handles.

Figure 4, view showing manner of arranging the parts when the beam is made of wood.

Letter A, handles, by which the machine is guided.

Letter B, beam.

Letter C, hook, in form of a coarse rake.

Letters $d$ $d'$, rods or bars, connecting the handles.

Letter $e$, short lever, attached to the bar $d$.

The object of our invention is to provide a machine that, with the aid of a horse, will greatly facilitate the cleaning of manure from stables, collecting it together in the yard, or for any similar purpose.

This machine may be made either of wood or iron, or both combined. The handles A and the beam B may be of wood, and the remainder of iron, either wrought or malleable.

In large stables, where a great number of horses or cattle are kept, and the manure is all to be removed to one point, this will be found a valuable labor-saving machine.

The beam B is divided or formed in two parts at the rear end, thus connecting with the hook by hinged joints at two different points, as may be seen by reference to the drawings.

The handles are made fast to the two sides of the beam, in front, and near the hook C, by screws or bolts.

Notches or slats are cut in the under side of the handles, at a point over the top of the hook, as seen at $i$ $i$, in fig. 2. When the hook is in an upright position, the upper part fits into the slots $i$ $i$, and is held firmly.

The lever $e$, the end of which extends into the slot $j$, in the back part of the hook C, enables us to lift or move the machine by the handles, without relieving the hook from its upright position.

The manner of operating is this. Attaching a horse to the beam B, and placing the hook, in the position shown in fig. 1, at the farther end of the stable, we start the horse, taking hold of the handles, to steady and guide it. We collect, as we move along, all the straw and manure, carrying it to the point desired. Then, by disengaging the lever $e$, and raising the handles A, the hook is brought into the position shown in fig. 2, and relieved of its load. In that position it is returned to the stable, when we arrive at the starting-point, and by simply raising the machine by the handles, the hook drops into position again, and is ready for use.

We make the hook or rake part two or two and a half feet long, as may seem desirable.

When the beam B is made of wood, it may be attached to the hook C, in the centre, by a single joint, the handles being made fast to each side thereof, as seen in fig. 4.

By reference to the drawings it will be seen that the handles in figs. 1 and 2 are turned upward and inward at the lower end, thus forming hooks or stops $p$ $p$, so arranged as to strike on the top of the beam B, when the hook is in the position shown in fig. 2.

This arrangement enables us to raise the machine by the handles, and bring the hook into a perpendicular position when desired.

We are aware that manure-hooks have been made, provided with a lever or catch, forming a stop or support for the hook; this we do not claim.

What we claim as our invention, and desire to secure by Letters Patent, is—

1. The handles A, provided with the slots $i$ $i$, and the stops $p$ $p$, in combination with the beam B and hook C, substantially as described, and for the purposes set forth.

2. The lever $e$, to act in conjunction with the slot $j$, as and for the purposes specified.

In testimony whereof, we have signed our names to this specification, in the presence of two subscribing witnesses.

MICHAEL STOLL.
HENRY GROSS.

Witnesses:
B. S. PETERS,
JOHN LARESH.